(12) United States Patent
Kim et al.

(10) Patent No.: US 12,464,489 B2
(45) Date of Patent: Nov. 4, 2025

(54) ELECTRONIC DEVICE FOR LOCALIZATION AND METHOD OF OPERATING THE SAME

(71) Applicant: Samsung Electronics Co., Ltd., Suwon-si (KR)

(72) Inventors: Hyunchul Kim, Suwon-si (KR); Moonseok Kang, Suwon-si (KR); Yi Yang, Suwon-si (KR); Kunyoung Choi, Suwon-si (KR); Sukgi Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 428 days.

(21) Appl. No.: 17/971,910

(22) Filed: Oct. 24, 2022

(65) Prior Publication Data

US 2023/0164736 A1    May 25, 2023

Related U.S. Application Data

(63) Continuation of application No. PCT/KR2022/013665, filed on Sep. 14, 2022.

(30) Foreign Application Priority Data

Nov. 22, 2021 (KR) ........................ 10-2021-0161041

(51) Int. Cl.
*H04W 64/00* (2009.01)
*H04L 5/00* (2006.01)

(52) U.S. Cl.
CPC ......... *H04W 64/003* (2013.01); *H04L 5/0048* (2013.01)

(58) Field of Classification Search
CPC .... H04W 64/00; H04W 64/003; H04L 5/0048
See application file for complete search history.

(56) References Cited

U.S. PATENT DOCUMENTS

| 2011/0019567 A1 | 1/2011 | Jiao et al. |
| 2014/0286226 A1 | 9/2014 | Seok et al. |
| (Continued) | | |

FOREIGN PATENT DOCUMENTS

| KR | 10-2014-0081498 A | 7/2014 |
| KR | 10-1603450 B1 | 3/2016 |
| (Continued) | | |

OTHER PUBLICATIONS

International Search Report dated Dec. 26, 2022, issued in International Application No. PCT/KR2022/013665.

(Continued)

*Primary Examiner* — Justin Y Lee
(74) *Attorney, Agent, or Firm* — Jefferson IP Law, LLP

(57) ABSTRACT

An electronic device including a communication circuit and at least one processor is disclosed. The at least one processor is configured to receive at least one downlink frame to be used for localization of the electronic device in a downlink time period from at least one anchor node through the communication circuit, transmit an uplink frame including anchor information indicating the at least one anchor node and device identification information about the electronic device in an uplink time period through the communication circuit, and receive location information indicating a location of the electronic device calculated based on the uplink frame from the at least one anchor node through the communication circuit.

12 Claims, 10 Drawing Sheets

(56) References Cited

U.S. PATENT DOCUMENTS

| | | |
|---|---|---|
| 2017/0245306 A1 | 8/2017 | Kim et al. |
| 2019/0195981 A1 | 6/2019 | Ding et al. |
| 2019/0331781 A1 | 10/2019 | McLaughlin et al. |
| 2020/0137715 A1* | 4/2020 | Edge ..................... H04L 5/0051 |
| 2020/0191979 A1 | 6/2020 | Lindskog |
| 2020/0229121 A1 | 7/2020 | Younis |
| 2020/0404450 A1 | 12/2020 | Duan et al. |
| 2021/0065885 A1 | 3/2021 | Receveur et al. |
| 2021/0112127 A1* | 4/2021 | Zhu ...................... H04L 69/321 |
| 2021/0159938 A1 | 5/2021 | Subraveti et al. |
| 2021/0160659 A1 | 5/2021 | Moon |
| 2022/0124457 A1 | 4/2022 | Priyanto et al. |

FOREIGN PATENT DOCUMENTS

| | | |
|---|---|---|
| KR | 10-1637797 B1 | 7/2016 |
| KR | 10-2017-0043550 A | 4/2017 |
| KR | 10-2019-0079586 A | 7/2019 |
| KR | 10-2020-0073144 A | 6/2020 |
| KR | 10-2021-0121213 A | 10/2021 |
| WO | 02/071093 A2 | 9/2002 |
| WO | 2020/092714 A1 | 5/2020 |

OTHER PUBLICATIONS

European Search Report dated Feb. 3, 2025, issued in European Application No. 22895815.3.

* cited by examiner

ELECTRONIC DEVICE FOR LOCALIZATION AND METHOD OF OPERATING THE SAME

CROSS-REFERENCE TO RELATED APPLICATION(S)

This application is a continuation application, claiming priority under § 365(c), of an International application No. PCT/KR2022/013665, filed on Sep. 14, 2022, which is based on and claims the benefit of a Korean patent application number 10-2021-0161041, filed on Nov. 22, 2021, in the Korean Intellectual Property Office, the disclosure of which is incorporated by reference herein in its entirety.

TECHNICAL FIELD

The disclosure relates to an electronic device for localization and a method of operating the same.

BACKGROUND ART

Ultra-wideband (UWB) is a wireless technology developed to transmit data at a high data rate with very little power over a very short distance. The UWB short-range radio technology may be used to complement other long-range radio technologies such as Wi-Fi, worldwide interoperability for microwave access (WiMAX), and cellular broadband communication. UWB has been developed to provide accurate, reliable and efficient short-range communication, compared to Bluetooth.

The UWB radio technology enables object localization with relatively high accuracy indoors and outdoors. In order to increase localization accuracy, UWB may use a time difference of arrival (TDoA) and two-way ranging, which may be referred to as TDoA ranging.

TDoA-based localization schemes in UWB may be divided into an uplink TDoA scheme using a signal transmitted by a user equipment (UE), and a downlink TDoA scheme using signals received from anchor nodes.

In the uplink TDoA scheme, when anchor nodes receive an uplink signal from a UE, the uplink signal arrives at the anchor nodes at different times according to the locations of the anchor nodes. A central station may estimate the location of the UE using arrival time differences (i.e., TDoAs) of the uplink signal.

In the downlink TDoA scheme, the location of the UE may be calculated using TDoAs related to times at which the UE receives downlink signals sequentially transmitted by the anchor nodes. The anchor nodes may transmit their downlink signals in given time slots (hereinafter, referred to as slots) or time periods.

Both the uplink TDoA scheme and the downlink TDoA scheme require time synchronization between the anchor nodes, or each anchor node's compensation for synchronization mismatch between anchor nodes.

The above information is presented as background information only to assist with an understanding of the disclosure. No determination has been made, and no assertion is made, as to whether any of the above might be applicable as prior art with regard to the disclosure.

DISCLOSURE

Technical Problem

The uplink time difference of arrival (TDoA) scheme has its limitations in the number of UEs accommodable in a network. Each of UEs to be localized periodically transmits an uplink signal. As the number of UEs to be localized increases, the number of collision occurrences between uplink signals transmitted by the UEs may increase exponentially. Even though various techniques of avoiding collision are applied, there may exist UEs requiring periodic localization such as path search. When the number of UEs requiring localization exceeds an allowed number in the network, localization may not be performed properly in the whole network.

In the downlink TDoA scheme, since a predetermined number of anchor nodes may transmit downlink signals, and UEs have only to receive the downlink signals, substantially an infinite number of UEs may participate in localization. However, a UE implemented as a mobile device has poor reception sensitivity due to the limitation of its form factor, compared to an anchor node. Accordingly, a gain achievable in signal reception may be different from in signal transmission by several dB or more, thereby decreasing the success rate of localization, compared to the uplink TDoA scheme.

Aspects of the disclosure are to address at least the above-mentioned problems and/or disadvantages and to provide at least the advantages described below. An aspect of the disclosure is to provide an electronic device and method that compensates for the shortcoming of each of the uplink TDoA scheme and the downlink TDoA scheme, and advantageously achieve the performance of the uplink TDoA scheme and the capacity of the downlink TDoA scheme by combining the two schemes.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device may include a communication circuit and at least one processor operatively coupled to the communication circuit. The at least one processor may be configured to receive at least one downlink frame to be used for localization of the electronic device in a downlink time period from at least one anchor node through the communication circuit. The at least one processor may be configured to transmit an uplink frame including anchor information indicating the at least one anchor node and device identification information about the electronic device in an uplink time period through the communication circuit. The at least one processor may be configured to receive location information indicating a location of the electronic device calculated based on the uplink frame from the at least one anchor node through the communication circuit.

In accordance with another aspect of the disclosure, an anchor node is provided. The anchor node may include a communication circuit and at least one processor operatively coupled to the communication circuit. The at least one processor may be configured to transmit a downlink frame for localization of an electronic device in a downlink time period through the communication circuit. The at least one processor may be configured to receive an uplink frame from the electronic device in an uplink time period through the communication circuit. The at least one processor may be configured to, in response to the uplink frame including anchor information indicating the anchor node, receive timestamps from a plurality of other anchor nodes through the communication circuit, the timestamps indicating reception times of the uplink frame in a data collection period. The at least one processor may be configured to transmit location information indicating a location of the electronic device calculated based on the timestamps to the electronic device.

In accordance with another aspect of the disclosure, a method of operating an electronic device is provided. The method may include receiving at least one downlink frame to be used for localization of the electronic device in a downlink time period from at least one anchor node. The method may include transmitting an uplink frame including anchor information indicating the at least one anchor node and device identification information about the electronic device in an uplink time period. The method may include receiving location information indicating a location of the electronic device calculated based on the uplink frame from the at least one anchor node.

In accordance with another aspect of the disclosure, a method of operating an anchor node is provided. The method may include transmitting a downlink frame for localization of an electronic device in a downlink time period. The method may include receiving an uplink frame from the electronic device in an uplink time period. The method may include, in response to the uplink frame including anchor information indicating the anchor node, receiving timestamps from a plurality of other anchor nodes, the timestamps indicating reception times of the uplink frame in a data collection period. The method may include transmitting location information indicating a location of the electronic device calculated based on the timestamps to the electronic device.

Advantageous Effects

An electronic device and a method of operating the same according to embodiments may compensate for the shortcoming of each of an uplink time difference of arrival (TDoA) scheme and a downlink TDoA scheme, and advantageously achieve the performance of the uplink TDoA scheme and the capacity of the downlink TDoA scheme by combining the two schemes.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
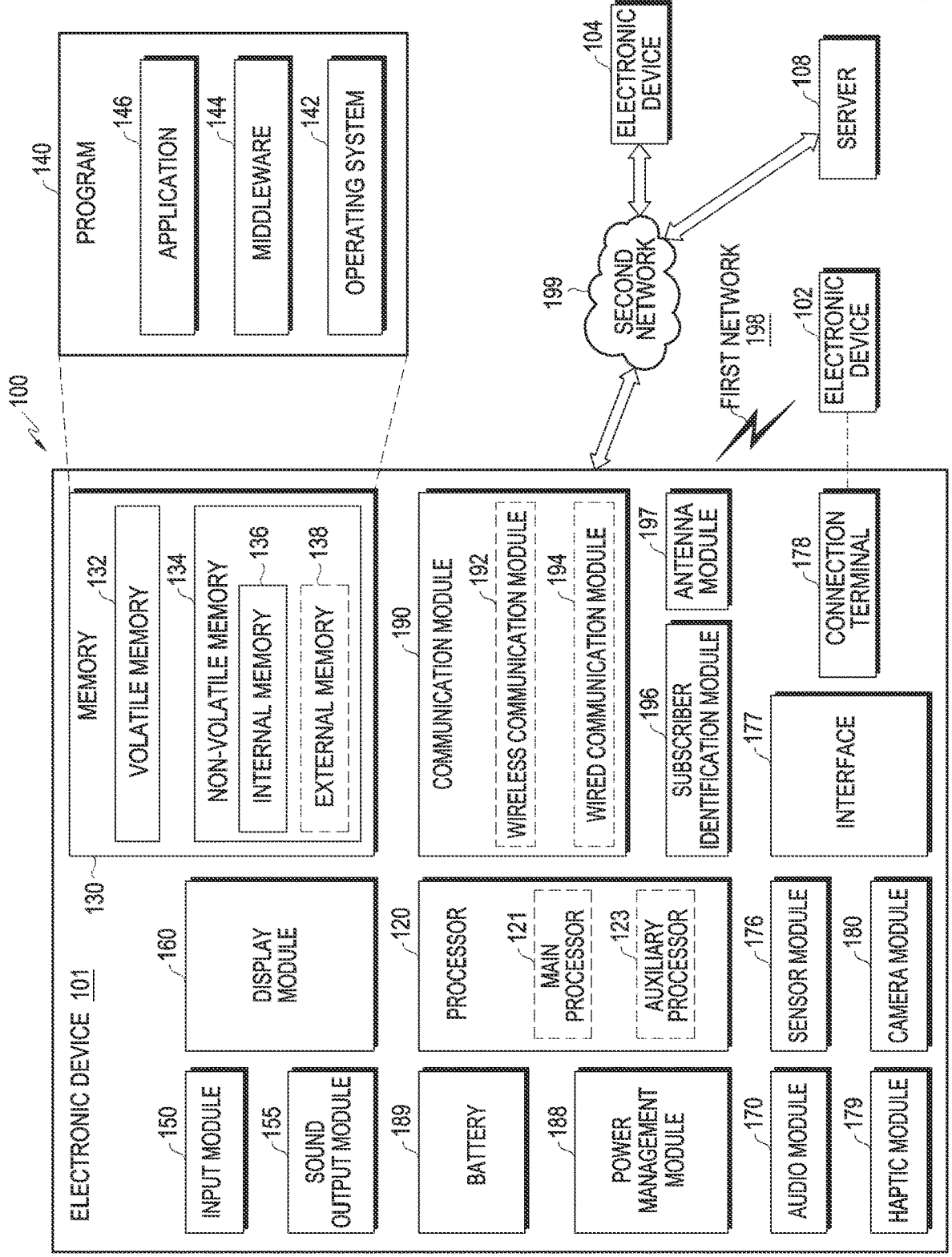
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include internal memory 136 or external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
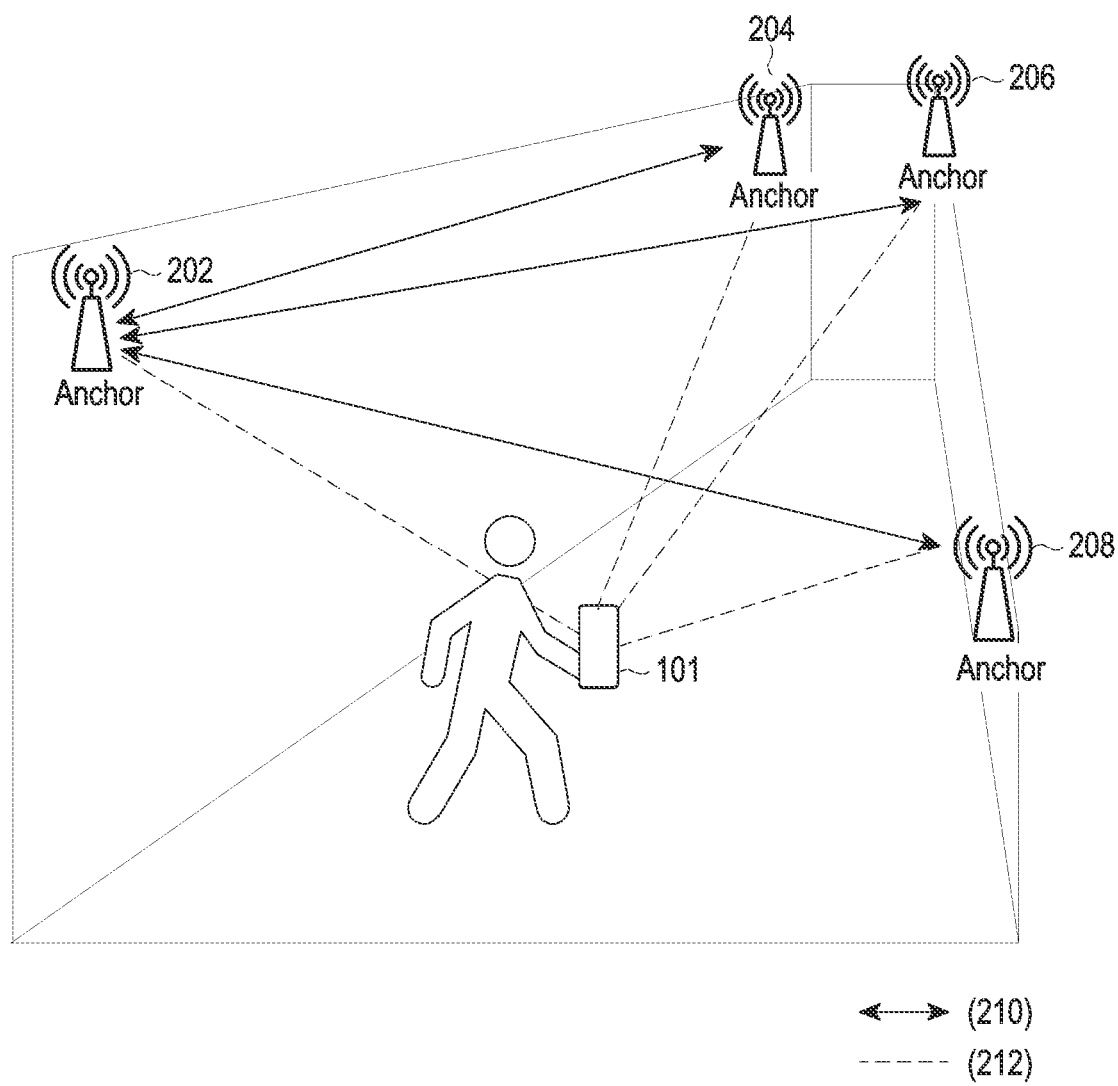
FIG. 2 is a diagram illustrating a time difference of arrival (TDoA)-based localization system according to an embodiment of the disclosure.

FIG. 2 is a diagram illustrating a time difference of arrival (TDoA)-based localization system according to an embodiment of the disclosure.

Referring to FIG. 2, a plurality of anchor nodes 202, 204, 206, and 208 may exchange TDoA messages in the form of frames. Hereinbelow, TDoA messages may be referred to as TDoA frames. The anchor nodes 202, 204, 206, and 208 may be pre-installed, and information about the locations of the anchor nodes 202, 204, 206, and 208 may be stored in the electronic device 101 which is movable. According to an embodiment of the disclosure, the information about the locations may be transmitted wirelessly to the electronic device 101 or pre-stored in the electronic device 101. According to another embodiment, the information about the locations may be stored in a server (e.g., the server 108 of FIG. 1), and the electronic device 101 may download the information about the locations from the server.

The anchor nodes 202, 204, 206, and 208 may be located on a line of sight (LOS) of the electronic device 101. The transmission timings and roles (e.g., initiator or responder) of the anchor nodes 202, 204, 206, and 208 in a given slot may be pre-configured prior to a TDoA operation for localization of the electronic device 101. For example, a master anchor (e.g., the anchor node 202), which is one of the plurality of anchor nodes, may manage the transmission timings of the anchor nodes 202, 204, 206, and 208.

In a DL TDoA scheme, the electronic device 101 may overhear, through radio channels 212, DL TDoA frames are exchanged on communication channels 210 among the anchor nodes 202, 204, 206, and 208, and measure the reception times of the DL TDoA frames. For example, the electronic device 101 should measure TDoAs for at least three anchor nodes, for localization of the electronic device 101 in a two-dimensional space, and require TDoAs for at least four anchor nodes for localization of the electronic device 101 in a three-dimensional space. The electronic device 101 may calculate its location based on the TDoAs and the given locations of the anchor nodes 202, 204, 206 and 208.

In a UL TDoA scheme, the electronic device 101 may transmit, on the radio channels 212, a UL TDoA frame including identification information (e.g., a medium access control (MAC) address) about the electronic device 101, which is receivable at neighboring anchor nodes (e.g., the anchor nodes 202, 204, 206, and 208). For example, the anchor nodes 202, 204, and 206 may receive the UL TDoA frame and share measured TDoA values for the UL TDoA frame or report the measured TDoA values to the electronic device 101 or a server (not shown), and the location of the electronic device 101 may be calculated based on the TDoA values and the locations of the anchor nodes 202, 204, and 206.

Figure 3:
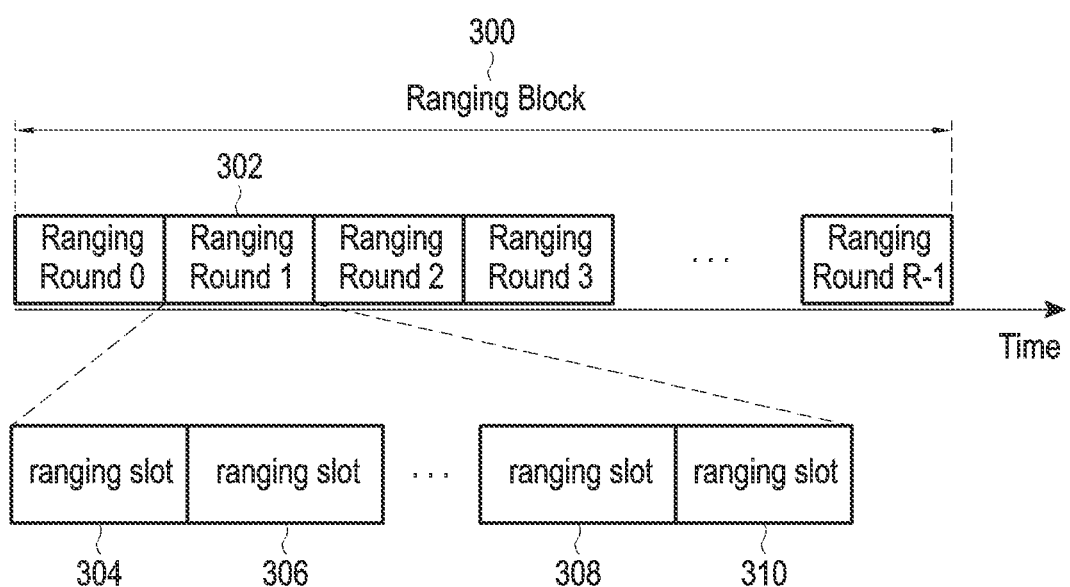
FIG. 3 is a diagram illustrating a ranging block structure used for TDoA localization according to an embodiment of the disclosure.

FIG. 3 illustrates the structure of a ranging block for TDoA localization according to an embodiment of the disclosure.

Referring to FIG. 3, a ranging block 300 may include N ranging rounds (ranging round 0 to ranging round R−1). The length of the ranging block 300 may be determined in consideration of a latency requirement. For example, the length of the ranging block 300 may be determined to be less than 100 ms. The number of ranging rounds in one ranging block 300 may be determined in consideration of the performance of anchor nodes (e.g., the density of master anchors) and a requirement for TDoA localization. While not shown, a guard time may be applied between ranging rounds in an embodiment.

Each ranging round (e.g., ranging round 1 302) may include a plurality of ranging slots, and the number of ranging slots included in each ranging round may be determined in consideration of the number of anchor nodes that may exist on the LoS of the electronic device 101. Each ranging slot may be defined as a unit time period during which one TDoA frame may be transmitted. A master anchor (e.g., the anchor node 202), which is one of a plurality of anchor nodes, may manage a ranging round (e.g., ranging round 1 302), and transmit information about ranging round 1 302 to the other anchor nodes.

The number of ranging slots 304, 306, 308, and 310 included in one ranging round (e.g., ranging round 1 302) may be greater than the number of a master anchor and anchor nodes located around the master anchor. The first ranging slot 304 and the last ranging slot 310 may be specified to be used by the master anchor, and the remaining ranging slots (e.g., the ranging slots 306 and 308) may be allocated to the other anchor nodes, respectively.

Figure 4A:
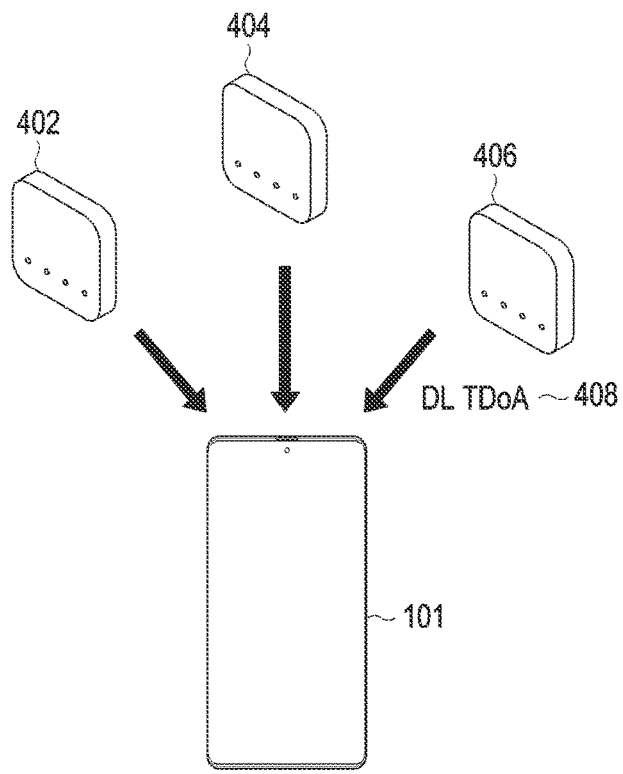
FIG. 4A is a diagram illustrating localization in a downlink TDoA scheme according to an embodiment of the disclosure.

FIG. 4A is a diagram illustrating localization in the DL TDoA scheme according to an embodiment of the disclosure.

Referring to FIG. 4A, each of a plurality of (e.g., at least three) anchor nodes 402, 404, and 406 (e.g., including at least one of the anchor nodes 202, 204, 206, and 208) may transmit a DL TDoA frame 408, using a pre-agreed time period (e.g., a DL-TDoA period 502 of FIG. 5) and radio channel. In an embodiment, the pre-agreed time period may be at least one predetermined slot in every ranging round (e.g., ranging round 1 302 of FIG. 3).

Each DL TDoA frame 408 may include a slot index identifying a ranging slot in which the DL TDoA frame 408 is transmitted. Each DL TDoA frame 408 may include allocation information required for transmission of a subsequent UL TDoA frame, for example, information indicating a UL time period (e.g., a UL-TDoA period 504 of FIG. 5). Each DL TDoA frame 408 may include allocation information used for the anchor node to transmit information about the location of the electronic device 101 (e.g., information indicating a DL time period (e.g., a report period 508 of FIG. 5)).

The electronic device 101 may calculate its location, using TDoA values measured for the DL TDoA frames 408, or report information about the TDoA values to a server (not shown) so that the server may calculate the location of the electronic device 101.

The electronic device 101 may determine that it is necessary to additionally transmit a UL TDoA frame for localization in the UL TDoA scheme. When the electronic device 101 or the server has failed to calculate the location of the electronic device 101 or determines that a valid location of the electronic device 101 has not been obtained, the electronic device 101 may determine to transmit a UL TDoA frame for localization in the UL TDoA scheme.

When the electronic device 101 has failed to receive at least three DL TDoA frames, when location information calculated based on DL TDoA frames is outside a map (e.g., a map corresponding to an indoor space, when the electronic device 101 operates for indoor navigation), or when currently calculated location information has an error equal to or greater than a given allowed range, compared to a previously calculated location, the electronic device 101 may determine that it has failed in calculating the location of the electronic device 101 or has not obtained a valid location of the electronic device 101. Failure to calculate the location of the electronic device 101 and failure to obtain a valid location of the electronic device 101 may be used interchangeably.

The electronic device 101 may determine to transmit a UL TDoA frame for localization in the UL TDoA scheme to substitute for or reinforce localization in the DL TDoA scheme for various reasons (e.g., when initial ranging starts, when a specific location-based service is performed, or when the accuracy of a location measured in the DL TDoA scheme needs to be increased), in addition to the above case.

Figure 4B:
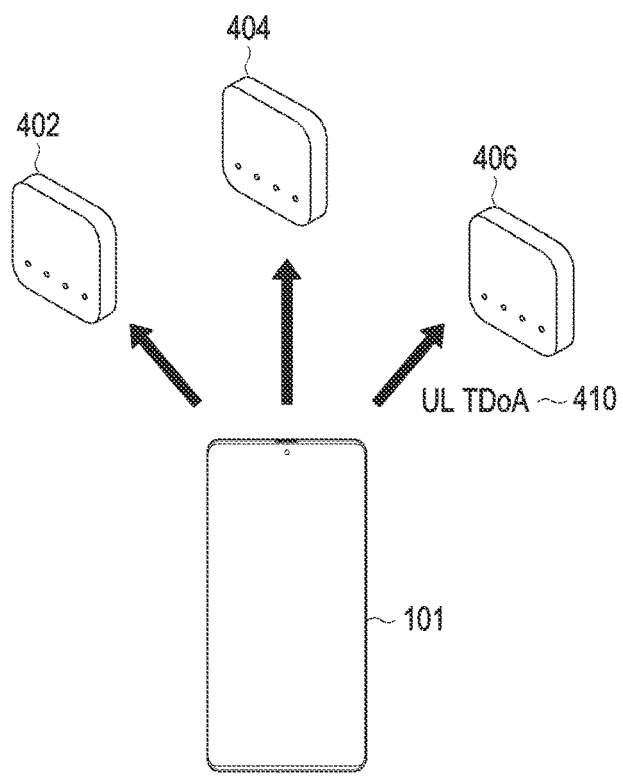
FIG. 4B is a diagram illustrating localization in an uplink TDoA scheme according to an embodiment of the disclosure.

FIG. 4B is a diagram illustrating localization in a UL TDoA scheme according to an embodiment of the disclosure.

Referring to FIG. 4B, when the electronic device 101 fails in localization based on the DL TDoA scheme or fails to obtain a valid location, the electronic device 101 may determine to perform localization based on the UL TDoA scheme. To perform localization based on the UL TDoA scheme, the electronic device 101 may transmit a UL TDoA frame 410, using a pre-agreed time period (e.g., the UL-TDoA period 504 of FIG. 5) and a pre-agreed radio channel.

The UL TDoA frame 410 may include information identifying the electronic device 101 (e.g., a MAC address). The MAC address included in the UL TDoA frame 410 may be randomly assigned at a time of transmitting the UL TDoA frame 410 by the electronic device 101. The UL TDoA frame 410 may include anchor information about at least one of the anchor nodes 402, 404, and 406 that have transmitted the DL TDoA frames 408 in the DL TDoA scheme.

The anchor information may be included in the UL TDoA frame 410 to indicate at least one anchor node specified to calculate location information about the electronic device 101 among the anchor nodes 402, 404, and 406 that have transmitted the DL TDoA frames 408. The anchor information may include identification information (e.g., an anchor index) identifying at least one anchor node from which the electronic device 101 has succeeded in receiving a DL TDoA frame 408. The anchor information may include identification information (e.g., an anchor index) identifying at least one anchor node that the electronic device 101 specifies based on the reception quality (e.g., received signal strength indicator (RSSI) or field of view (FoV) value) of a DL TDoA frame 408.

The UL TDoA frame 410 may be received by a plurality of (e.g., at least three) anchor nodes 402, 404, and 406 (e.g., including at least one of the anchor nodes 202, 204, 206, and 208) around the electronic device 101. The anchor nodes 402, 404, and 406 may share timestamps indicating reception times of the UL TDoA frame 410 with each other or report the timestamps to the electronic device 101 or the server (not shown). The location of the electronic device 101 may be calculated based on the TDoA values and the locations of the anchor nodes 402, 404, and 406 by any one of the anchor nodes 402, 404, and 406.

One anchor node (e.g., the anchor node 406) specified from among the anchor nodes 402, 404, and 406 by the electronic device 101 may receive the UL TDoA frame 410 in a pre-agreed time period (e.g., the UL-TDoA period of FIG. 5) from the electronic device 101, and calculate the distance to the electronic device 101 using the reception time of the UL TDoA frame 410. In addition, the anchor node 406 may receive timestamps indicating times when the other anchor nodes (e.g., the anchor node 402 and the anchor node 404) have received the UL TDoA frame 410 from the other anchor nodes, and calculate the distance between each anchor node and the electronic device 101 based on the timestamps. Since the anchor node 406 has prior knowledge of its location and the locations of the other anchor nodes, the anchor node 406 may calculate the location of the electronic device 101 by triangulation.

Figure 5:
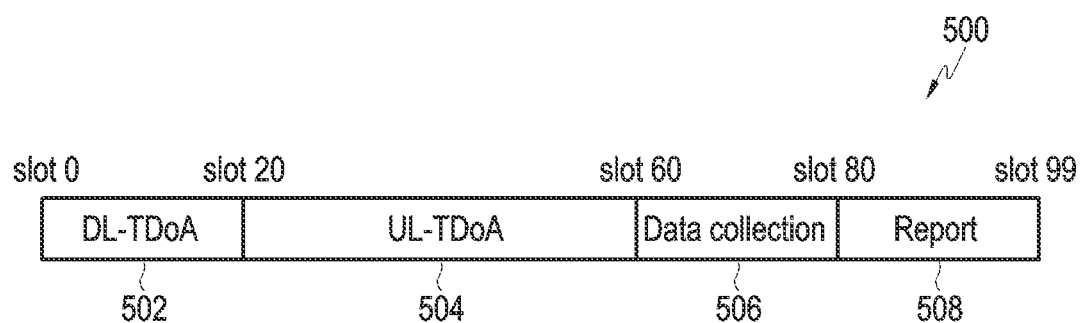
FIG. 5 is a diagram illustrating a ranging round including a downlink TDoA period and an uplink TDoA period according to an embodiment of the disclosure.

For UWB-based localization, a ranging round (e.g., ranging round 1 302) may include a DL-TDoA period, a UL-TDoA period, and a data collection period (e.g., a data collection period 506 of FIG. 5). The ranging round may further include a report period (e.g., the report period 508 of FIG. 5) following the data collection period. A DL TDoA frame transmitted in the DL-TDoA period by each anchor node may include a current slot index, the start slot index and the end slot index of the UL-TDoA period, and a slot index to be used by the anchor node within the report period, when the report period exists.

The electronic device 101 may determine to perform UWB-based localization according to a user request or a need in the electronic device 101. The electronic device 101 may attempt to calculate the location of the electronic device 101 in the DL-TDoA period according to the DL TDoA scheme. When the electronic device 101 fails to calculate the valid location of the electronic device 101, the electronic device 101 may transmit a UL TDoA frame in the UL-TDoA period, for localization in the UL-TDoA scheme. The UL TDoA frame may include anchor information indicating at least one specified anchor node and device identification information (e.g., an arbitrarily assigned random MAC address) about the electronic device 101. The specified anchor node may be determined by the electronic device 101, based on DL TDoA frames that the electronic device 101 has successfully received during the DL-TDoA period.

Each anchor node may receive a UL TDoA frame transmitted by the electronic device 101 in the UL-TDoA period. Each anchor node may also identify an anchor node specified by the electronic device 101 based on the UL TDoA frame. The other anchor nodes except for the specified anchor node may transmit timestamps indicating reception times of the UL TDoA frame to the specified anchor node. The specified anchor node may calculate location information about the electronic device 101 based on the timestamps. The location information may be transmitted from the specified anchor node to the electronic device 101 in the report period.

FIG. 5 is a diagram illustrating a ranging round including a DL-TDoA period and a UL-TDoA period according to an embodiment of the disclosure.

Referring to FIG. 5, a plurality of slots (e.g., the ranging slots 304, 306, 308, and 310) included in a ranging round 500 may be allocated to the DL-TDoA period 502, the UL-TDoA period 504, the data collection period 506, and the report period 508. The report period 508 may be omitted. For example, the ranging round 500 may include 100 ranging slots. 20 slots (slot 0 to slot 19) may be allocated to the DL-TDoA period 502, 40 slots (slot 20 to slot 59) may be allocated to the UL-TDoA period 504, 20 slots (slot 60 to slot 79) may be allocated to the data collection period 506, and 20 slots (slot 80 to slot 99) may be allocated to the report period 508, when needed. In an embodiment, the ranging round 500 may be at least one (e.g., ranging round 1 302) of the R ranging rounds included in the ranging block 300 illustrated in FIG. 3. In an embodiment, the ranging round 500 may be at least one given ranging round (e.g., ranging round 1 302) within at least one given ranging block.

The DL-TDoA period 502, which is a time period used for localization based on the DL TDoA scheme, may include a plurality of ranging slots that may correspond to a plurality of anchor nodes (e.g., the anchor nodes 402, 404, and 406) located around the electronic device 101. For example, the DL-TDoA period 502 may include 20 ranging slots, and the ranging slots may be allocated to at least 20 anchor nodes (e.g., the anchor nodes 402, 404, and 406) located around the electronic device 101, respectively.

Each anchor node may be allocated at least one unique ranging slot within the DL-TDoA period 502 and transmit its DL TDoA frame (e.g., the DL TDoA frame 408) in its ranging slot. For example, anchor nodes 1, 2, . . . 20 may be allocated to slots 0, 1, . . . 19, respectively in the DL-TDoA period 502. Control information that allocates the anchor nodes to the ranging slots in the DL-TDoA period 502 may be pre-configured for the anchor nodes and the electronic device 101. Alternatively, the control information may be included in a ranging control message (RCM) and transmitted to the other anchor nodes and/or the electronic device 101 by the master anchor. According to an embodiment of the disclosure (not shown), the message (e.g., RCM) including the control information may be transmitted in slot 0 of the ranging round 500. The anchor nodes may communicate DL TDoA frames with each other in the DL-TDoA period 502 according to double sided two way ranging (DS-TWR), and the electronic device 101 may receive the DL TDoA frames by sniffing.

The electronic device 101 may activate (e.g., turn on) a UWB reception circuit in the DL-TDoA period 502 and receive the DL TDoA frames transmitted by the anchor nodes in the ranging slots within the DL-TDoA period 502.

The UL-TDoA period 504, which is a time period used for localization based on the UL TDoA scheme, may include a plurality of ranging slots in which the electronic device 101 may transmit a UL TDoA frame (e.g., the UL TDoA frame 410). When the electronic device 101 fails in localization based on the DL TDoA scheme during the DL-TDoA period 502, the electronic device 101 may determine to transmit a UL TDoA frame during the UL-TDoA period 504.

The UL TDoA frame may be transmitted in a selected one of the ranging slots in the UL-TDoA period 504. The ranging slot may be randomly selected, for example, from among the ranging slots of the UL-TDoA period 504. In an embodiment, the electronic device 101 may transmit the UL TDoA frame in at least one ranging slot of the UL-TDoA period 504. The number of ranging slots included in the UL-TDoA period 504 may be determined in a manner that ensures transmission of UL TDoA frames from a plurality of UEs. For example, the UL-TDoA period 504 may include 40 ranging slots. For example, the electronic device 101 may select at least one slot (e.g., slot 21) from among slot 20 to slot 59 included in the UL-TDoA section 504, randomly or according to a given rule, and transmit the UL TDoA frame in the selected slot.

The anchor nodes, which may include the anchor nodes 402, 404, and 406, may activate (e.g., turn on) UWB reception circuits at the start time of the UL-TDoA period 504, and monitor whether a UL TDoA frame has been received in ranging slots within the UL-TDoA period 504 from the electronic device 101 through the UWB reception circuits. At least one anchor node may receive the UL TDoA frame from the electronic device 101 in at least one ranging slot within the UL-TDoA period 504, and obtain a timestamp indicating a reception time of the UL TDoA frame. In an embodiment, upon receipt of the UL TDoA frame in any one ranging slot (e.g., slot 21) within the UL-TDoA period 504, the at least one anchor node may deactivate (e.g., turn off) the UWB reception circuit in subsequent slots (e.g., slot 22 to slot 59).

The data collection period 506 may be used for the anchor nodes (e.g., which may include the anchor nodes 402, 404, and 406) to exchange the timestamps for the received UL TDoA frame with each other. In an embodiment, the number of ranging slots allocated to the data collection period 506 may be determined based on the number of a plurality of anchor nodes (e.g., which may include the anchor nodes 402, 404 and 406) located around the electronic device 101. For example, the data collection period 506 may include 20 ranging slots, and the ranging slots may be allocated respectively to at least 20 anchor nodes (e.g., which may include the anchor nodes 402, 404 and 406) located around the electronic device 101. Each anchor node may have at least one unique ranging slot within the data collection period 506, and transmit information about the timestamp in its ranging slot, so that the other anchor nodes may receive the timestamp.

The data collection period 506 may include the same number of ranging slots as the DL-TDoA period 502, and anchor nodes 1, 2, . . . 20 may be allocated to slots 60, 61, . . . 79 of the data collection period 506, respectively. For example, anchor information included in the UL TDoA frame may specify anchor node 5, and anchor node 5 may activate the UWB reception circuit in a plurality of slots within the data collection period 506 and collect the timestamps transmitted from the other anchor nodes. At least one other anchor node other than anchor node 5 (e.g., anchor node 10), may receive the UL TDoA frame in slot 21 in the UL-TDoA period 504, measure a timestamp, and transmit information about the timestamp in slot 69 of the data collection period 506.

When the report period 508 is included in the ranging round 500, the report period 508 may be used for at least one of the anchor nodes, which may include the anchor nodes 402, 404 and 406, to report location information about the electronic device 101 calculated based on collected information (e.g., the timestamps) to the electronic device 101 in the data collection period 506. The number of ranging slots allocated to the report period 508 may be determined based on the number of a plurality of anchor nodes, which may include the anchor nodes 402, 404 and 406, located around the electronic device 101. For example, the report period 508 may include the same number of ranging slots as the DL-TDoA period 502 and/or the data collection period 506. The report period 508 may include 20 ranging slots, and the ranging slots may be allocated respectively to at least 20 anchor nodes (e.g., which may include the anchor nodes 402, 404 and 406)). For example, anchor nodes 1, 2, . . . 20 may be allocated to slots 80, 81, . . . 99 in the report period 508, respectively.

Each anchor node may be allocated at least one unique ranging slot within the report period 508, and at least one anchor node (e.g., anchor node 5) which may be specified by the UL TDoA frame transmitted in the UL-TDoA period 504 may transmit location information about the electronic device 101 to the electronic device 101 in its ranging slot (e.g., slot 84).

Anchor node 5 may transmit, to the electronic device 101, information about the timestamps received from the other anchor nodes and the timestamp measured by anchor node 5 in slot 84 of the report period 508, instead of the location information about the electronic device 101. Then, the electronic device 101 may calculate the location information about the electronic device 101 based on the information about the timestamps and the known locations of the anchor nodes.

According to an embodiment of the disclosure, the report period 508 may be omitted from the ranging round 500, and the location information about the electronic device 101 (or the information about the timestamps) may be included and transmitted to the electronic device 101 in a DL TDoA frame transmitted in a DL-TDoA period of a next ranging round (or a next ranging block). The location information about the electronic device 101 (or the information about the timestamps) may be transmitted to the electronic device 101, using an out-of-band (OOB) frequency channel. According to an embodiment, the electronic device 101 may calculate the location of the electronic device 101 using the information about timestamps received in DL TDoA frames or OOB frequency channels and the known locations of the anchor nodes.

The DL-TDoA period 502, the data collection period 506, and the report period 508 may be contention free periods (CFPs) including ranging slots allocated to the respective anchor nodes, and the UL-TdoA period 504 may be a contention access period (CAP) which a plurality of electronic devices may compete to use.

Figure 6:
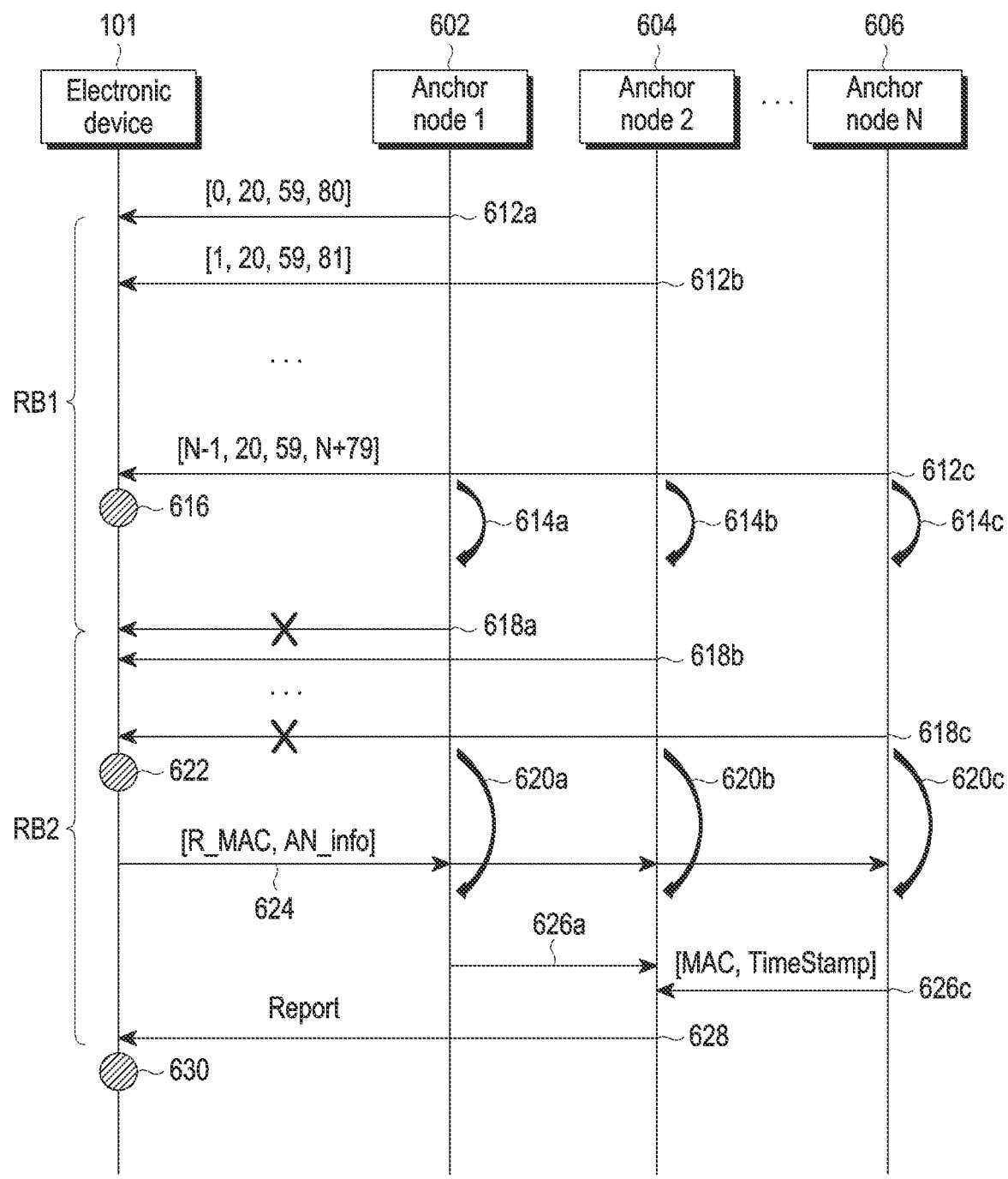
FIG. 6 is a diagram illustrating a signal flow for localization of an electronic device according to an embodiment of the disclosure.

FIG. 6 is diagram illustrating a signal flow for localization of an electronic device according to an embodiment of the disclosure.

Referring to FIG. 6, although the electronic device 101 succeeds in localization based on the DL TDoA scheme in ranging block 1 (RB1), the electronic device 101 fails in localization based on the DL TDoA scheme in ranging block 2 (RB2). Accordingly, the electronic device 101 performs localization based on the UL TDoA scheme. The electronic device 101 may communicate with anchor node 1 602, anchor node 2 604, and anchor node N 606 (e.g., which may include at least one of the anchor nodes 202, 204, 206, and 208, or the anchor nodes 402, 404 and 406).

While an embodiment in which one ranging round is included in each ranging block, and each ranging round has the structure of FIG. 5 in FIG. 6, a plurality of ranging rounds having the same structure may be included in one ranging block, and the operations of FIG. 6 may be performed in one or more ranging rounds or one or more ranging blocks.

Referring to FIG. 6, in operations 612a, 612b, and 612c, each of the anchor nodes 602, 604, and 606, which may include the anchor nodes 402, 404, and 406, may broadcast a DL TDoA frame (e.g., the DL TDoA frame 408) in an allocated ranging slot within a DL-TDoA period (e.g., the DL-TDoA period 502) in RB1. For example, in operation 612a, anchor node 1 602 may broadcast a first DL TDoA frame in ranging slot 0 within the DL-TDoA period. The first DL TDoA frame may include the value [0] of a current slot index identifying ranging slot 0.

The first DL TDoA frame may include allocation information indicating a subsequent UL-TDoA period (e.g., the UL-TDoA period 504). The allocation information may include a pair of a start UL slot index and an end UL slot index of the UL-TDoA period, for example, [20, 59]. The first DL TDoA frame may include a report slot index as allocation information indicating a subsequent report period (e.g., the report period 508). The report slot index may include an offset value corresponding to the current slot index. In the example illustrated in FIG. 6, the report period starts in slot 80, and thus the first DL TDoA frame may include the value [80] of the report slot index. Hereinafter, it may be said that the first DL TDoA frame includes [0, 20, 59, 80].

In operation 612b, anchor node 2 604 may broadcast a second DL TDoA frame in ranging slot 1 within the DL-TDoA period. The second DL TDoA frame may include [1, 20, 59, 81] indicating a current slot index, the start UL slot index, the end UL slot index, and a report slot index, respectively. In operation 612c, anchor node N 606 may broadcast a third DL TDoA frame in ranging slot N−1 within the DL-TDoA period. The third DL TDoA frame may include [N−1, 20, 59, N+79] indicating a current slot index, the start UL slot index, the end UL slot index, and a report slot index, respectively.

In operations 614a, 614b, and 614c, anchor node 1 602, anchor node 2 604, and anchor node N 606 may activate (or turn on) their UWB reception circuits after transmitting the first DL TDoA frame, the second DL TDoA frame, and the third DL TDoA frame, respectively. Each of the anchor nodes 602, 604 and 606 may turn on the UWB reception circuit immediately after transmitting its DL TDoA frame or at the start of the subsequent UL-TDoA period.

In operation 616, the electronic device 101 may receive the first DL TDoA frame, the second DL TDoA frame, and the third DL TDoA frame, and succeed in calculating its location information, using TDoA values calculated based on the reception times of the DL TDoA frames.

When determining that the localization is successful in the DL-TDoA period in operation 616, the electronic device 101 may not perform localization based on the UL TDoA scheme, ignoring information about the UL-TDoA period included in the DL TDoA frames. The electronic device 101 may not transmit a UL TDoA frame in the UL-TDoA period of RB 1.

In operations 618a, 618b, and 618c, each of the anchor nodes 602, 604, and 606 may broadcast a DL TDoA frame (e.g., the DL TDoA frame 408) in an allocated ranging slot within a DL-TDoA period (e.g., the DL-TDoA period 502) in RB 2. For example, in operation 618a, anchor node 1 602 may broadcast a fourth DL TDoA frame in ranging slot 0 within the DL-TDoA period. The fourth DL TDoA frame may include [0, 20, 59, 80] indicating the current slot index, the start UL slot index, the end UL slot index, and the report slot index, respectively. In operation 618b, anchor node 2 604 may broadcast a fifth DL TDoA frame in ranging slot 1 within the DL-TDoA period. The fifth DL TDoA frame may include [1, 20, 59, 81] indicating the current slot index, the start UL slot index, the end UL slot index, and the report slot index, respectively. In operation 618c, anchor node N 606 may broadcast a sixth DL TDoA frame in ranging slot N−1 within the DL-TDoA period. The sixth DL TDoA frame may include [N−1, 20, 59, N+79] indicating the current slot index, the start UL slot index, the end UL slot index, and the report slot index, respectively.

In operations 620a, 620b, and 620c, anchor node 1 602, anchor node 2 604, and anchor node N 606 may activate (or turn on) their UWB reception circuits after transmitting the fourth DL TDoA frame, the fifth DL TDoA frame, and the sixth DL TDoA frame, respectively. In an embodiment, each of the anchor nodes 602, 604 and 606 may turn on the UWB reception circuit immediately after transmitting its DL TDoA frame or at the start of the subsequent UL-TDoA period.

The electronic device 101 may fail to receive the fourth DL TDoA frame from anchor node 1 602 and the sixth DL TDoA frame from anchor node N 606, while succeeding in receiving only the fifth DL TDoA frame from anchor node 2 605. The electronic device 101 may not be able to identify an anchor node from which the electronic device 101 will receive a DL TDoA frame according to at least one of a grip state, an obstacle, or a location. Therefore, only a DL TDoA frame (e.g., RCM) transmitted by an anchor node, such as a master anchor, may include allocation information about the UL-TDoA period and/or the report period. When the electronic device 101 fails to receive the DL TDoA frame from the master anchor, the electronic device 101 may not be able to identify the configuration of a ranging round.

As illustrated in FIG. 6, because all of the fourth, fifth, and sixth DL TDoA frames include allocation information for the UL-TDoA period and/or the report period, even though the electronic device 101 receives only the fifth DL TDoA frame, the electronic device 101 may calculate the start time of the next ranging block based on the current slot index included in the fifth DL TDoA frame, and calculate the start time and the end time of the UL-TDoA period based on the start UL slot index and the end UL slot index included in the fifth DL TDoA frame.

When the fifth DL TDoA frame includes [1, 20, 59, 81] and a slot duration is 1 ms, the electronic device 101 may recognize that a time period spanning from a time after 19 ms from the current ranging slot to a time before 59 ms from the current ranging slot is the UL-TDoA period for localization based on the UL TDoA scheme, and a time period after 80 ms from the current ranging slot is the report period in which location information resulting from the localization based on the UL TDoA scheme may be received.

To calculate a location according to the DL TDoA scheme, the electronic device 101 needs to receive DL TDoA frames from at least three anchor nodes. Otherwise, the electronic device 101 may determine that localization based on the DL TDoA scheme has failed and determine to transmit a UL TDoA frame in the UL-TDoA period for localization based on the UL TDoA scheme from which better anchor reception performance may be expected, in operation 622. The electronic device 101 may use the UL-TDoA period within the same ranging block (or ranging round) as the DL-TDoA period in which the localization has been determined as failed, or use the UL-TDoA period of any one of subsequent ranging blocks (or ranging rounds), for localization based on the UL TDoA scheme. While it has been described that a UL TDoA frame for localization based on the UL TDoA scheme is transmitted in the UL-TDoA period of the same ranging block in the illustrated example, the disclosure is not limited thereto.

Even when the electronic device 101 receives three or more DL TDoA frames in the DL-TDoA period, the electronic device 101 may fail in localization. For example, the electronic device 101 may calculate location information different from an actual location by mistaking multiple paths for a single path and thus calculating wrong timestamps. When location information calculated in the DL-TDoA period of the current ranging block has an unacceptable error, such as when a location obtained from a previous ranging block is spaced apart from a location calculated from the current ranging block by a given value (e.g., tens of meters) or more, the electronic device 101 may determine that localization based on the DL TDoA scheme has failed, and determine to transmit a UL TDoA frame in the UL-TDoA period.

In operation 624, the electronic device 101 may broadcast a UL TDoA frame (e.g., the UL TDoA frame 410) in at least one ranging slot selected within the UL-TDoA period (e.g., the UL-TDoA period 504) of RB 2, determining that the localization has failed in the DL-TDoA period. The electronic device 101 may randomly select a ranging slot within the UL-TDoA period to broadcast the UL TDoA frame. The UL TDoA frame may include device identification information (e.g., a MAC address) about the electronic device 101 and at least one field indicating anchor information, for example, [R_MAC, AN_info]. R_MAC may include a randomly generated MAC address.

The device identification information (e.g., the MAC address) about the electronic device 101 included in the UL TDoA frame may be randomly determined for every transmission. After transmitting the UL TDoA frame using the random MAC address, location information about the electronic device 101 may be received in the report period from an anchor node, using the same MAC address. When OOB is not used to deliver report information, a random MAC address may be used to prevent a malicious user from stealing the location information. The MAC address of the electronic device 101 may be randomly set for the UL-TDoA period. The MAC address of the electronic device 101 may be randomly set in every ranging block.

The anchor information in the UL TDoA frame may indicate at least one anchor node, such as anchor node 2, which has transmitted a DL TDoA frame successfully received in the DL-TDoA period. When successfully receiving DL TDoA frames from a plurality of anchor nodes, the electronic device 101 may select at least one anchor node having the best communication quality in consideration of RSSIs or FoV values. The electronic device 101 may select at least one anchor node having an RSSI higher than those of the other anchor nodes by a given value (e.g., 10 dB) or more, or select at least one anchor node included within a given FoV range. The anchor information included in the UL TDoA frame may specify at least one anchor node selected by the electronic device 101 or all anchor nodes from which DL TDoA frames have been received successfully.

Since the electronic device 101 succeeds in receiving the DL TDoA frame from anchor node 2 604 in operation 618b, the UL TDoA frame transmitted in operation 624 may include the device identification information (e.g., the randomly generated MAC address) about the electronic device 101, and at least one field indicating anchor information about the anchor node 2 604, for example, [0×1234, 0×0002] in operation 618b.

Anchor node 1 602, anchor node 2 604, and anchor node N 606 which have turned on the UWB reception circuits and monitored UL reception in operations 620a, 620b, and 620c may receive the UL TDoA frame from the electronic device 101 in operation 624. Each of anchor node 1 602, anchor node 2 604, and anchor node N 606 may determine a timestamp indicating a reception time of the UL TDoA frame. Anchor node 2 604 may identify that the UL TDoA frame includes anchor information specifying itself.

In operations 626*a* and 626*c*, the other anchor nodes except for anchor node 2 604 specified by the anchor information in the UL TDoA frame, such as anchor node 1 602 and anchor node N 606, may transmit timestamps indicating the reception times of the UL TDoA frame in allocated ranging slots within a data collection period (e.g., the data collection period 506) of RB 2. For example, in operation 626*a*, anchor node 1 602 may transmit a first data frame including a first timestamp in ranging slot 60 within the data collection period. The first data frame may include identification information (e.g., MAC address) identifying anchor node 1 602 and the first timestamp. The first data frame may be received by anchor nodes other than anchor node 1 602, such as anchor node 2 604. For example, in operation 626*c*, anchor node N 606 may transmit a second data frame including a second timestamp in ranging slot 79 within the data collection period. The second data frame may include anchor identification information (e.g., MAC address) identifying anchor node N 606 and the second timestamp. The second data frame may be received by anchor nodes other than anchor node N 606, for example anchor node 2 604. When anchor node N 606 receives one or more UL TDoA frames, the second data frame transmitted by anchor node N 606 may include timestamps for the one or more UL TDoA frames.

An anchor node that has not received the UL TDoA frame or the anchor node (e.g., anchor node 2 604) specified by the UL TDoA frame may not transmit a data frame in an allocated ranging slot within the data collection period. Anchor node 2 604 specified by the UL TDoA frame may monitor reception of the data frames transmitted from the other anchor nodes (e.g., anchor node 1 602 and anchor node N 606) in the ranging slots of the data collection period. Anchor node 2 604 obtains the information (e.g., MAC addresses and timestamps) included in the data frames transmitted from the other anchor nodes (e.g., anchor node 1 602 and anchor node N 606), and store the device identification information (e.g., MAC address included in the UL TDoA frame) about the electronic device 101 that has transmitted the UL TDoA frame.

Anchor node 2 604 may calculate the location of the electronic device 101 based on the timestamps obtained in the data collection period, and known location information about the corresponding anchor nodes (e.g., anchor node 1 602 and anchor node N 606). The location of the electronic device 101 may be an absolute location including a latitude and a longitude or a relative location based on a specified location. In an embodiment, anchor node 2 604 may transmit the timestamps obtained in the data collection period as they are to the electronic device 101, so that the electronic device 101 may calculate its location.

In operation 628, anchor node 2 604 may broadcast a report frame including location information about the electronic device 101 in an allocated ranging slot within the report period (e.g., the report period 508) of RB 2. For example, anchor node 2 604 may broadcast the report frame including the location information about the electronic device 101 in ranging slot 81 within the data collection period. When anchor node 2 604 is specified by UL TDoA frames from two or more electronic devices (e.g., including the electronic device 101) in UL-TDoA periods, the report frame may include location information about the two or more electronic devices. When anchor node 2 604 fails to measure the location from the UL TDoA scheme, for example, when anchor node 2 604 fails to receive data frames from at least two anchor nodes during the data collection period, the report frame may include information or a value indicating that the localization based on the UL TDoA scheme has failed.

After transmitting the UL TDoA frame in the UL-TdoA period, the electronic device 101 may deactivate (e.g., turn off) the UWB reception circuit until the report period, turn on the UWB reception circuit in a ranging slot (e.g., ranging slot 81) allocated to the anchor node (e.g., anchor node 2 604) specified by the UL TdoA frame among the ranging slots of the report period, and receive the report frame from anchor node 2 604.

In operation 630, the electronic device 101 may obtain the location information about the electronic device 101 from the report frame received from anchor node 2 604. In an embodiment, the report frame may include information about the timestamps measured by the anchor nodes (e.g., anchor node 1 602, anchor node 2 604, and anchor node N 606). In operation 630, the electronic device 101 may directly calculate the location of the electronic device 101 using the known locations of the anchor nodes and the timestamps.

Figure 7:
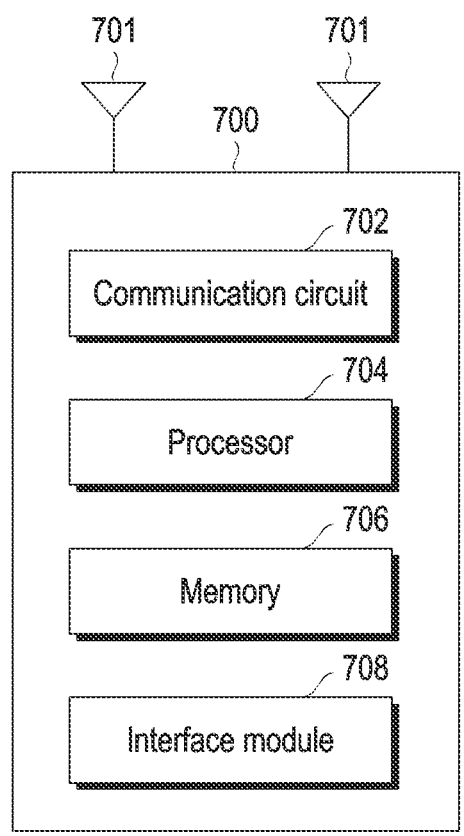
FIG. 7 is a block diagram illustrating an anchor node according to an embodiment of the disclosure.

FIG. 7 is a block diagram illustrating an anchor node 700 according to an embodiment of the disclosure.

Referring to FIG. 7, the illustrated anchor node 700 may be any one of the anchor nodes 402, 404, and 406 of FIGS. 4A and 4B and the anchor nodes 602, 604, and 606 of FIG. 6.

Referring to FIG. 7, the anchor node 700 may be a communication device implementing a UWB scheme. The anchor node 700 may include a communication circuit 702 (e.g., the communication module 190 of FIG. 1) that transmits/receives signals to/from an external electronic device (e.g., the electronic device 101), using one or more antennas 701. The communication circuit 702 may include a UWB transmission circuit and a UWB reception circuit which implement the UWB scheme.

The anchor node 700 may include a processor 704 (e.g., the processor 120 of FIG. 1) which may be implemented as one or more single-core processors or as one or more multi-core processors, and memory 706 (e.g., the memory 130 of FIG. 1) storing instructions for the operations of the anchor node 700.

The anchor node 700 may include an interface module 708 (e.g., the interface 177 of FIG. 1) that provides a wired and/or wireless interface for communicating with components outside a network.

The electronic device 101 according to an embodiment of the disclosure may include the communication circuit 192 and the at least one processor 120 operatively coupled to the communication circuit. The at least one processor may be configured to receive at least one DL frame to be used for localization of the electronic device in a DL time period from at least one anchor node through the communication circuit. The at least one processor may be configured to transmit an UL frame including anchor information indicating the at least one anchor and device identification information about the electronic device in an UL time period through the communication circuit. The at least one processor may be configured to receive location information indicating a location of the electronic device calculated based on the UL frame from the at least one anchor through the communication circuit.

The device identification information may include a MAC address randomly generated for the UL time period.

The at least one processor may be configured to determine to transmit the UL frame in the UL time period, in response to the number of the at least one DL frame being less than three, in response to the location of the electronic device calculated using the at least one DL frame being outside a given map, in response to the location of the electronic device calculated using the at least one DL frame having an error equal to or greater than a given allowed range, or in response to localization based on an UL scheme being required.

Each of the at least one DL frame may include a current slot index, a start UL slot index and an end UL slot index related to the UL time period, and optionally, a report slot index indicating a report period in which the location information is received.

The at least one processor may be configured to turn on the communication circuit in a ranging slot allocated to the at least one anchor within the report period and monitor reception of the location information, after transmitting the UL frame.

The at least one processor may be configured to transmit the UL frame in one ranging slot selected from among a plurality of ranging slots within the UL time period.

The anchor node 700 according to an embodiment of the disclosure may include the communication circuit 702 and the at least one processor 704 operatively coupled to the communication circuit. The at least one processor may be configured to transmit a DL frame for localization of an electronic device in a DL time period through the communication circuit. The at least one processor may be configured to receive an UL frame from the electronic device in an UL time period through the communication circuit. The at least one processor may be configured to, in response to the UL frame including anchor information indicating the anchor node, receive timestamps indicating reception times of the UL frame in a data collection period from a plurality of other anchor nodes through the communication circuit. The at least one processor may be configured to transmit location information indicating a location of the electronic device calculated based on the timestamps to the electronic device.

The UL frame may include a MAC address randomly configured for the UL time period by the electronic device.

The DL frame may include a current slot index, a start UL slot index and an end UL slot index related to the UL time period, and optionally, a report slot index indicating a report period in which the location information is transmitted.

The at least one processor may be configured to turn on the communication circuit in a plurality of ranging slots within the UL time period and monitor reception of the UL frame, after transmitting the DL frame.

Figure 8:
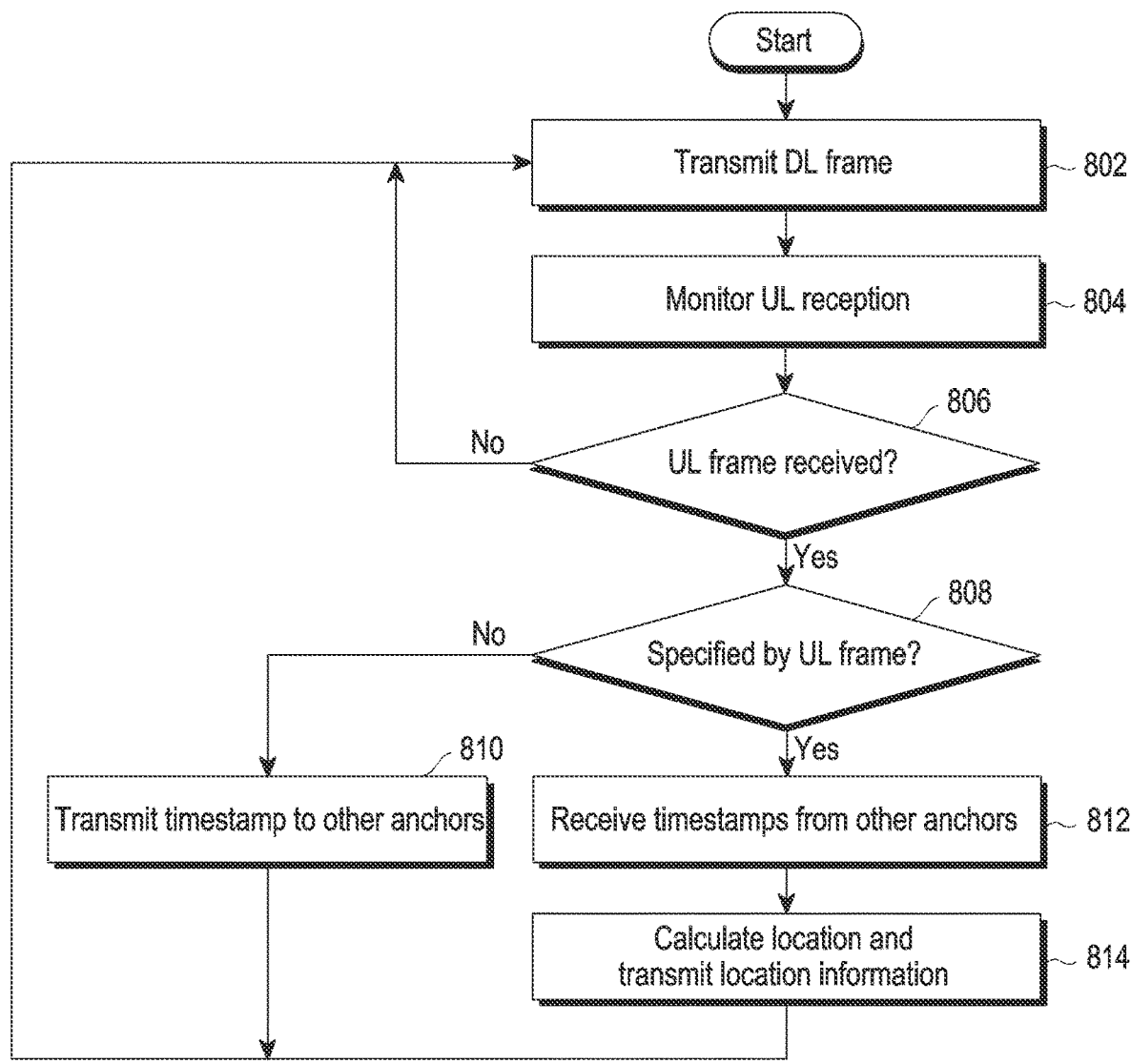
FIG. 8 is a flowchart illustrating an operation of an anchor node according to an embodiment of the disclosure.

FIG. 8 is a flowchart illustrating an operation of the anchor node 700 according to an embodiment of the disclosure.

Referring to FIG. 8, the illustrated operations may be performed in every ranging block, a given ranging block, or a given ranging round by the processor 704 of the anchor node 700 which may be any one of the anchor nodes 402, 404 and 406 of FIGS. 4A and 4B and the anchor nodes 602, 604 and 606 of FIG. 6.

Referring to FIG. 8, in operation 802, the anchor node 700 may transmit a DL frame (e.g., a DL TDoA frame) in an allocated ranging slot within a given DL time period (e.g., the DL-TDoA period 502). For example, when the anchor node 700 is anchor node 1 602 of FIG. 6, the allocated ranging slot may be ranging slot 0 in the DL-TDoA period. The DL frame may include a current slot index, a start UL slot index, and an end UL slot index. In an embodiment, the DL frame may further include a report slot index.

In operation 804, the anchor node 700 may monitor reception of a UL frame (e.g., a UL TDoA frame) in a given UL time period (e.g., the UL-TDoA period 504). The anchor node 700 may identify a UL time period specified by the start UL slot index and the end UL slot index provided by the DL frame in operation 802 and activate a UWB reception circuit in the UL time period to monitor whether there is a UL frame received during ranging slots within the UL time period.

In operation 806, the anchor node 700 may determine whether at least one UL frame has been received during the UL time period. The anchor node 700 may receive one or more UL frames transmitted from one or more UEs in one or more ranging slots within the UL time period. When at least one UL frame has not been received, the anchor node 700 may return to operation 802. When at least one UL frame has been received, the anchor node 700 may proceed to operation 808.

In operation 808, the anchor node 700 may determine whether anchor information included in the received UL frame specifies the anchor node 700. When the anchor information does not specify the anchor node 700, the anchor node 700 may proceed to operation 810. When the anchor information specifies the anchor node 700, the anchor node 700 may proceed to operation 812.

In operation 810, the anchor node 700 may broadcast a data frame including a timestamp indicating a reception time of the received UL frame in an allocated ranging slot within a given data collection period (e.g., the data collection period 506). In an embodiment, the data collection period may be determined as a time period following the end UL slot index provided by the DL frame in operation 802. After operation 810, the anchor node 700 may return to operation 802.

In operation 812, the anchor node 700 may receive data frames broadcast by the other anchor nodes in a plurality of ranging slots within the given data collection period. Each of the data frames may include a timestamp measured for the received UL frame during the UL time period by a corresponding anchor node. The anchor node 700 may receive a first UL frame from electronic device A and a second UL frame from electronic device B in operation 806, and anchor information in the first UL frame may specify the anchor node 700, whereas anchor information in the second UL frame may specify another anchor node. Then, the anchor node 700 may receive data frames broadcast by the other anchor nodes, and broadcast timestamp information for electronic device B in its allocated ranging slot in operation 812.

In operation 814, the anchor node 700 may calculate the location of the electronic device 101 that has transmitted the UL frame, using the timestamps received in the data frames, and transmit location information indicating the location to the electronic device 101. The anchor node 700 may calculate the location, using location information about the corresponding anchor nodes, the timestamp indicating the reception time of the UL frame at the anchor node 700, and the location information of the anchor node 700, together with the received timestamps. The anchor node 700 may transmit the location information to the electronic device 101, using device identification information (e.g., a MAC address) obtained from the UL frame. The anchor node 700 may transmit a report frame including the location information and the MAC address to the electronic device 101 in an allocated ranging slot within a report period (e.g., the report period 508) specified by the DL frame in operation 802.

The location information transmitted by the anchor node 700 in operation 814 may include information required to calculate the location of the electronic device 101, such as the timestamp of the UL frame measured by the anchor node 700 and the timestamps received from the other anchor nodes. In an embodiment, when the anchor node 700 fails to receive at least two timestamps in operation 812 or when the location information calculated in operation 814 has an unacceptable error, the location information may include a value (e.g., −1) indicating failure. In an embodiment, the anchor node 700 may transmit the location information to a server related to the electronic device 101 in operation 814.

Figure 9:
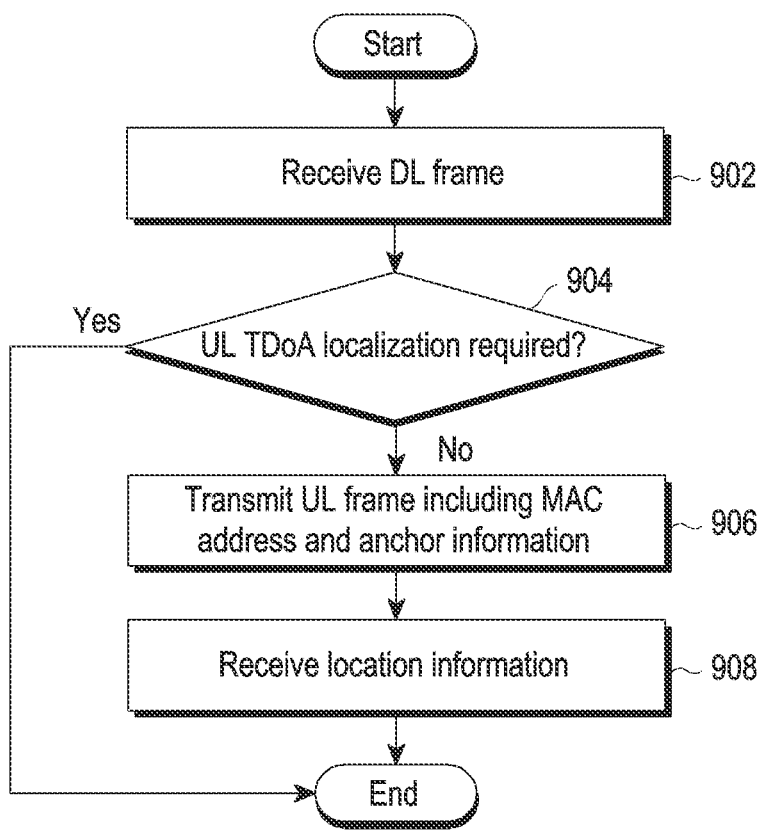
FIG. 9 is a flowchart illustrating an operation of an electronic device according to an embodiment of the disclosure.

FIG. 9 is a flowchart illustrating an operation of the electronic device 101 according to an embodiment of the disclosure.

Referring to FIG. 9, the illustrated operations may be performed in every ranging block, a given ranging block, or a given ranging round by the processor 120 of the electronic device 101.

Referring to FIG. 9, in operation 902, the electronic device 101 may monitor reception of at least one DL frame (e.g., a DL TDoA frame) in a plurality of ranging slots within a given DL time period (e.g., the DL-TDoA period 502). The electronic device 101 may attempt to calculate the location of the electronic device 101, using at least one DL frame received during the DL time period.

In operation 904, the electronic device 101 may determine whether localization based on the UL TDoA scheme is required. When the electronic device 101 fails to calculate the location of the electronic device 101 in operation 902 or when the electronic device 101 determines that localization based on the UL TDoA scheme is required for various reasons, the electronic device 101 may proceed to operation 906. In operation 902, when the electronic device 101 fails to receive a valid number of (e.g., at least three) DL frames during the DL time period, when the location of the electronic device 101 calculated based on three or more DL frames received during the DL time period is outside a given map, or when the location of the electronic device 101 calculated based on three or more DL frames received during the DL time period has an error equal to or greater than a given allowed range, it may be determined that the electronic device 101 has failed in calculating the location of the electronic device 101. The electronic device 101 may determine that localization based on the UL TDoA scheme is required, when initial ranging starts, a specific service starts or is in progress, or localization based on the DL TDoA scheme performed in operation 902 is to be replaced or reinforced.

When succeeding in calculating the location of the electronic device 101 or when determining that localization based on the UL TDoA scheme is not required, the electronic device 101 may end the procedure.

In operation 906, the electronic device 101 may transmit a UL frame including anchor information indicating at least one anchor node that has transmitted the at least one DL frame and device identification information (e.g., the MAC address) about the electronic device 101 in at least one ranging slot within a given UL period (e.g., the UL-TDoA period 504). The anchor information may indicate at least one anchor node that has transmitted at least one DL frame with the best signal quality among at least three DL frames received during the DL time period.

In operation 908, the electronic device 101 may receive location information calculated based on the UL frame from the anchor node indicated by the anchor information in the UL frame. In an embodiment, the location information may be transmitted during a report period defined in a current ranging block.

Figure 10:
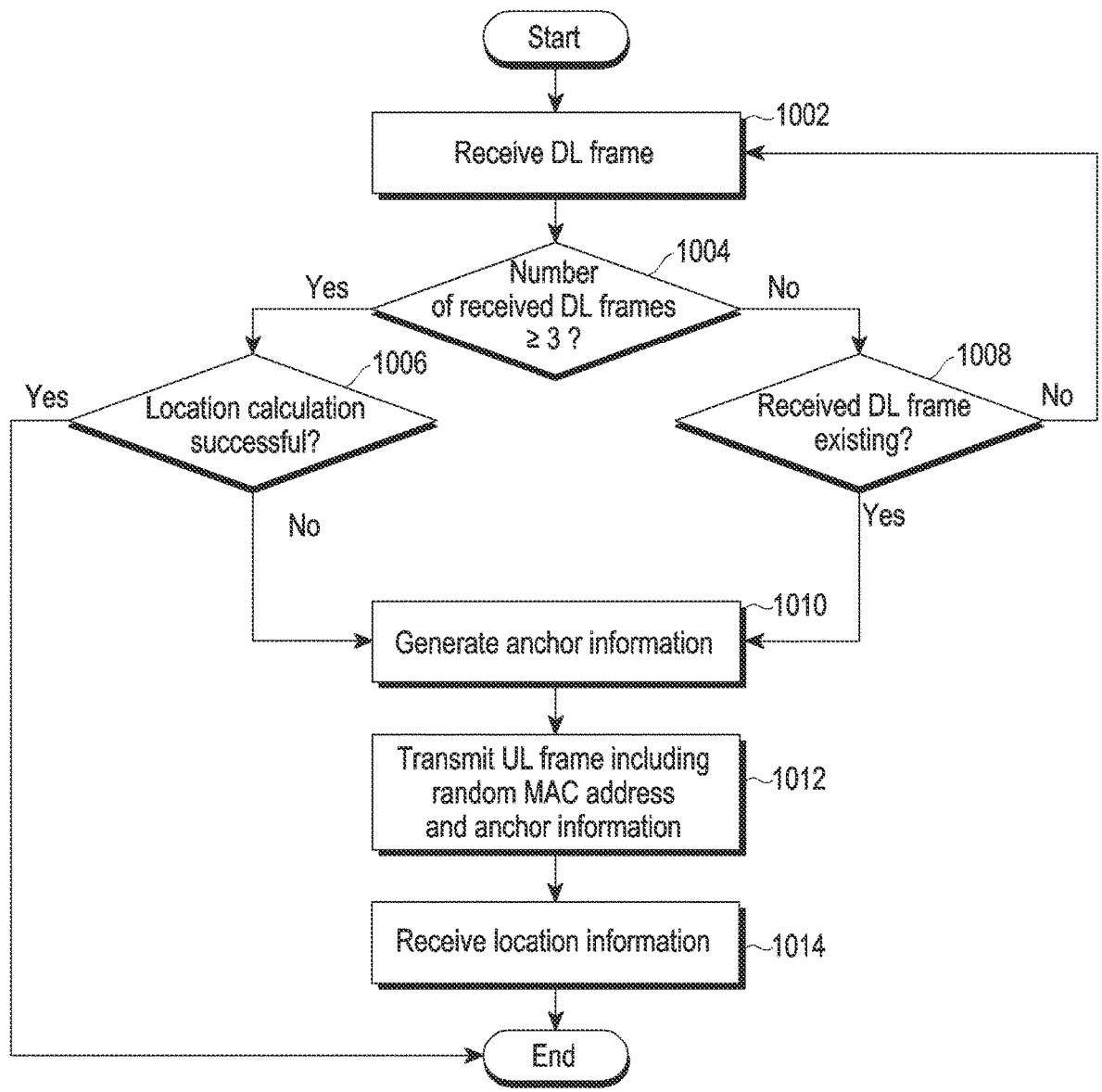
FIG. 10 is a flowchart illustrating an operation of an electronic device according to an embodiment of the disclosure.

FIG. 10 is a flowchart illustrating an operation of the electronic device 101 according to an embodiment of the disclosure. In an embodiment, the illustrated operations may be performed in every ranging block, a given ranging block, or a given ranging round by the processor 120 of the electronic device 101.

Referring to FIG. 10, in operation 1002, the electronic device 101 may monitor reception of at least one DL frame (e.g., a DL TDoA frame) in a plurality of ranging slots within a given DL time period (e.g., the DL-TDoA period 502).

In operation 1004, the electronic device 101 may determine whether the number of DL frames received during the DL time period is 3 or larger. When the number of the received DL frames is 3 or larger, the electronic device 101 may proceed to operation 1006. On the other hand, when the number of the received DL frames is less than 3, the electronic device 101 may proceed to operation 1008.

In operation 1006, the electronic device 101 may determine whether the location of the electronic device 101 may be calculated, using the three or more received DL frames. When succeeding in calculating the location of the electronic device 101, the electronic device 101 may end the procedure. When the electronic device 101 fails to calculate the location of the electronic device 101, the electronic device 101 may proceed to operation 1010.

In operation 1006, the electronic device 101 may calculate the location of the electronic device 101, using reception times of the three or more DL frames, and determine whether the location calculation is successful. In an embodiment, when the calculated location is outside a given map, the electronic device 101 may determine that the location calculation is not successful. When the calculated location has an error equal to or greater than an allowed error range, for example, when the calculated location is apart from location information calculated in a previous ranging block by a predetermined value (e.g., several tens of meters) or larger, the electronic device 101 may determine that the location calculation is failed. When determining that the location calculation is successful, the electronic device 101 may return to operation 1002. When the location calculation fails, the electronic device 101 may proceed to operation 1010. Even though the location calculation is successful in operation 1006, when the electronic device 101 determines that localization based on the UL TDoA scheme is required for various reasons (e.g., when an initial ranging operation is performed or when a specific location-based service starts or is in progress), the electronic device 101 may proceed to operation 1010.

In operation 1008, the electronic device 101 may determine whether at least one DL frame has been received during the DL time period. When at least one DL frame has not been received, the electronic device 101 may return to operation 1002. When at least one DL frame has not been received in operation 1008, the electronic device 101 may end the location calculation procedure. For example, the electronic device 101 may stop the location calculation until a given next ranging block or ranging round. When determining that at least one DL frame has been received in operation 1008, the electronic device 101 may proceed to operation 1010.

In operation 1010, the electronic device 101 may generate anchor information indicating at least one anchor node that has transmitted the at least one DL frame. In an embodiment, the electronic device 101 may identify an anchor node that has transmitted a DL frame according to the position of a ranging slot within the DL time period in which each DL frame is received. For example, when succeeding in receiving a DL frame in ranging slot 0, the electronic device 101 may identify that the DL frame has been transmitted from a first anchor node (e.g., anchor node 1 602). The anchor information may include information identifying the anchor node, for example, an anchor index.

When two or more DL frames have been received during the DL time period, the anchor information may indicate a given number of (e.g., at least one) anchor nodes that have transmitted DL frames having the best received signal quality, or all anchor nodes that have transmitted the two or more DL frames.

In operation 1012, the electronic device 101 may transmit a UL frame including device identification information (e.g., a MAC address randomly generated by the electronic device 101) along with the anchor information in at least one ranging slot within a given UL period (e.g., the UL-TDoA period 504) in the current ranging block. In an embodiment, the electronic device 101 may obtain a start UL slot index and an end UL slot index defining the UL time period from any one of the DL frames received in operation 1002, and identify the UL time period by the start UL slot index and the end UL slot index. In an embodiment, the electronic device 101 may select at least one ranging slot from among a plurality of ranging slots included in the identified UL time period, and transmit the UL frame in the selected ranging slot.

In operation 1014, the electronic device 101 may receive location information calculated based on the UL frame from the anchor node indicated by the anchor information in the UL frame. The location information may be transmitted during a report period defined in the current ranging block. In an embodiment, the electronic device 101 may obtain a report slot index defining the report period from any one of the DL frames received in operation 1002, and identify the report period based on the report slot index.

The electronic device 101 may receive a report frame including location information in a ranging slot corresponding to the anchor node indicated by the anchor information among a plurality of ranging slots included in the identified report period. The electronic device 101 may turn off the UWB reception circuit after the DL time period of operation 1002, and turn on the UWB reception circuit in the ranging slot corresponding to the anchor node indicated by the anchor information in the UL frame in the identified report period. The electronic device 101 may receive the location information from the anchor node or a server, using an OOB frequency channel.

A method of operating the electronic device 101 according to an embodiment of the disclosure may include receiving at least one DL frame to be used for localization of the electronic device in a DL time period from at least one anchor node (operation 902). The method may include transmitting an UL frame including anchor information indicating the at least one anchor node and device identification information (e.g., a MAC address) about the electronic device in an UL time period (operation 906). The method may include receiving location information indicating a location of the electronic device calculated based on the UL frame from the at least one anchor node (operation 908).

The device identification information may include a MAC address randomly generated for the UL time period.

The method may further include determining to transmit the UL frame in the UL time period based on a certain condition, wherein the certain condition may include one of: in response to the number of the at least one DL frame being less than three (operation 100), in response to the location of the electronic device calculated using the at least one DL frame being outside a given map (operation 1006), in response to the location of the electronic device calculated using the at least one DL frame having an error equal to or greater than a given allowed range (operation 1006), or in response to localization based on an UL scheme being required.

Each of the at least one DL frame may include a current slot index, a start UL slot index and an end UL slot index related to the UL time period, and optionally, a report slot index indicating a report period in which the location information is received.

The method may further include turning on a reception circuit of the electronic device in a ranging slot allocated to the at least one anchor node within the report period and monitoring reception of the location information, after transmitting the UL frame.

The method may further include selecting one ranging slot in which the UL frame is to be transmitted from among a plurality of ranging slots within the UL time period.

A method of operating the anchor node 700 according to various embodiments of the disclosure may include transmitting a DL frame for localization of an electronic device in a DL time period (operation 802). The method may include receiving an UL frame from the electronic device in an UL time period (operation 806). The method may include, in response to the UL frame including anchor information indicating the anchor node (operation 808), receiving timestamps indicating reception times of the UL frame in a data collection period from a plurality of other anchor node (operation 812). The method may include transmitting location information indicating a location of the electronic device calculated based on the timestamps to the electronic device (operation 814).

The UL frame may include a MAC address randomly configured for the UL period by the electronic device.

The DL frame may include a current slot index, a start UL slot index and an end UL slot index related to the UL time period, and optionally, a report slot index indicating a report period in which the location information is transmitted.

The method may further include turning on a reception circuit of the anchor node in a plurality of ranging slots within the UL time period and monitoring reception of the UL frame, after transmitting the DL frame.

The method may further include, in response to the anchor information not indicating the anchor node, broadcasting a data frame including a timestamp indicating a reception time of the received uplink frame in a ranging slot allocated to the anchor node within a data collection period.

The data collection period may be a time period following an end UL slot index provided by the downlink frame.

The method may further include calculating the location of the electronic device based on a time that the anchor node received the UL frame, location information of the anchor node, and the received timestamps.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   memory storing instructions;
   communication circuitry configured to support ultra-wide band (UWB) technology; and
   at least one processor operatively coupled to the communication circuitry,
   wherein the instructions, when executed by the at least one processor individually or collectively, cause the electronic device to:
   receive downlink frames to be used for localization of the electronic device in a downlink time period from anchor nodes through the communication circuitry,
   based on determining a failure to calculate a location of the electronic device using time difference of arrival (TDoA) information measured for the downlink frames, determine to perform uplink TDoA-based localization of the electronic device,
   based on determining to perform the uplink TDoA-based localization, broadcast an uplink frame including anchor information identifying at least one anchor node among the anchor nodes related to the received downlink frames and device information about the electronic device in an uplink time period through the communication circuitry, and
   receive location information indicating a location of the electronic device calculated based on the uplink frame through the communication circuity.

2. The electronic device of claim 1, wherein the device information includes a first medium access control (MAC) address identifying the electronic device, or a second MAC address randomly generated for the uplink time period.

3. The electronic device of claim 1, wherein the instructions, when executed by the at least one processor individually or collectively, cause the electronic device to determine to perform the uplink TDoA-based localization, in response to a number of the downlink frames being less than three, in response to the location of the electronic device calculated using the downlink frames being outside a given map, in response to the location of the electronic device calculated using the downlink frames having an error equal to or greater than a given allowed range, or in response to identifying the uplink TDoA-based localization being required.

4. The electronic device of claim 1, wherein each of the downlink frames includes:

a current slot index;

a start uplink slot index and an end uplink slot index related to the uplink time period; and optionally, a report slot index indicating a report period in which the location information is received.

5. The electronic device of claim 1, wherein the instructions, when executed by the at least one processor individually or collectively, cause the electronic device to:

select an anchor node having a best signal quality from among the anchor nodes, based on received signal strength indicators (RSSIs) and/or field of view (FoV) values of the downlink frames, wherein the anchor information includes an anchor index of the selected anchor node, and select at least one ranging slot to be used for broadcasting the uplink frame, among a plurality of ranging slots within the uplink time period.

6. The electronic device of claim 4, wherein the instructions, when executed by the at least one processor individually or collectively, cause the electronic device to:

turn on the communication circuitry in a ranging slot allocated to the at least one anchor node within the report period; and monitor reception of the location information, after transmission the uplink frame.

7. A method of operating an electronic device, the method comprising:

receiving downlink frames to be used for localization of the electronic device in a downlink time period from anchor nodes;

based on determining a failure to calculate a location of the electronic device using time difference of arrival (TDoA) information measured for the downlink frames, determining to perform uplink TDoA-based localization of the electronic device, based on determining to perform the uplink TDoA-based localization, broadcasting an uplink frame including anchor information identifying at least one anchor node among the anchor nodes related to the received downlink frames and device information about the electronic device in an uplink time period; and receiving location information indicating a location of the electronic device calculated based on the uplink frame.

8. The method of claim 7, wherein the device information includes a first medium access control (MAC) address identifying the electronic device, or a second MAC address randomly generated for the uplink time period.

9. The method of claim 7, further comprising:

determining to perform the uplink TDoA-based localization based on a condition, wherein the condition comprises at least one of:

in response to a number of the downlink frames being less than three, in response to the location of the electronic device calculated using the downlink frames being outside a given map, in response to the location of the electronic device calculated using the downlink frames having an error equal to or greater than a given allowed range, or in response to identifying the uplink TDoA-based localization being required.

10. The method of claim 7, wherein each of the downlink frames includes:

a current slot index, a start uplink slot index and an end uplink slot index related to the uplink time period, and optionally, a report slot index indicating a report period in which the location information is received.

11. The method of claim 7, further comprising:

select an anchor node having a best signal quality from among the anchor nodes, based on received signal strength indicators (RSSIs) and/or field of view (FoV) values of the downlink frames, wherein the anchor information includes an anchor index of the selected anchor node; and selecting at least one ranging slot to be used for broadcasting the uplink frame from among a plurality of ranging slots within the uplink time period.

12. The method of claim 10, further comprising:

turning on communication circuitry in a ranging slot allocated to the at least one anchor node within the report period; and monitoring reception of the location information through the communication circuitry, after transmission the uplink frame.

* * * * *